No. 749,451. PATENTED JAN. 12, 1904.
F. SAFFELL.
STEAM GENERATOR.
APPLICATION FILED APR. 27, 1903.
NO MODEL.

WITNESSES:

INVENTOR
Frederick Saffell
BY Geo. H. Strong
ATTORNEY.

No. 749,451. Patented January 12, 1904.

UNITED STATES PATENT OFFICE.

FREDERICK SAFFELL, OF FRESNO, CALIFORNIA, ASSIGNOR OF ONE-HALF TO RICHARD J. POWERS, OF SAN LEANDRO, CALIFORNIA.

STEAM-GENERATOR.

SPECIFICATION forming part of Letters Patent No. 749,451, dated January 12, 1904.

Application filed April 27, 1903. Serial No. 154,480. (No model.)

*To all whom it may concern:*

Be it known that I, FREDERICK SAFFELL, a citizen of the United States, residing at Fresno, county of Fresno, State of California, have invented an Improvement in Steam-Generators; and I hereby declare the following to be a full, clear, and exact description of the same.

My invention relates to an apparatus for generating steam; and it is especially designed to be used in conjunction with oil-burning devices and to supply the steam necessary or desirable to be used in conjunction with such oil-burners.

It consists of a chamber adapted to lie horizontally within the furnace or fireplace, so as to be subjected to the desired heat, means for supplying water and delivering it at the distant end of the generator, overflow-riffles disposed upon the bottom between said end of the chamber and the receiving end, and a dome or elevation from which the steam is delivered.

It also comprises a means for protecting the generator from too intense heat of the fire.

Figure 1:
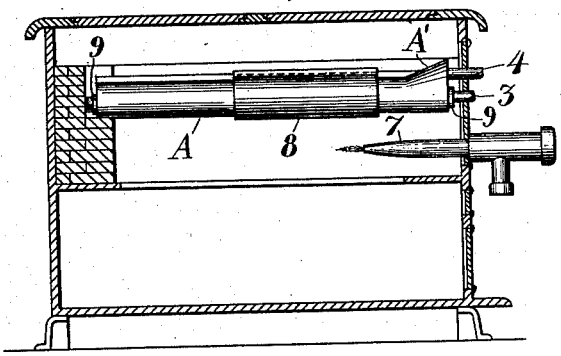
Figure 2:
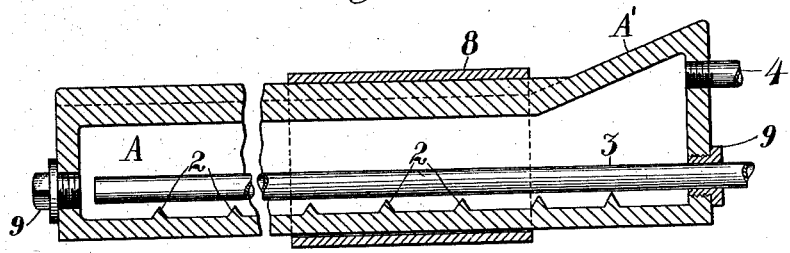

Referring to the accompanying drawings, Figure 1 is a view of the generator in position in the furnace. Fig. 2 is a sectional view of the generator.

It is the object of my present invention to provide a device for generating steam to be used in conjunction with an oil-burner.

I have here shown the generating-chamber A of substantially tubular section for the greater portion of its length, but having the receiving and discharge end elevated, so that the end view shows this portion in the form of a vertical oval, as at A', the object of this being to form a steam-dome from the higher portion of which the steam-discharge pipe 4 may lead. It will be understood that this portion of the generator might be made in different form, the object being to provide a steam-dome; but the present is a convenient arrangement for this purpose. The bottom of the chamber A has a series of transverse dams or riffles 2, which extend across it at intervals from near one end to the other.

3 is a pipe extending longitudinally through the lower part of the chamber and just above or resting upon the partitions 2. This pipe serves as an inlet for water, which passes through it from the receiving end and is delivered at the opposite end of the chamber, so as to fall into the space formed between the closed end of the chamber and the first of the riffles 2. This chamber may be heated in any suitable or desired manner. I have here shown the heater as in the form of an oil-burner of any suitable description, as at 7, and in order to protect the generator from too intense heat at particular points and also to divert the heat to such portion of the generator as may be desired I have shown a shield or guard 8, which incloses the generator and is slidable thereon, so that it may be interposed between the generator and the source of heat at any desired point within the length of the generator. The water may be admitted from any suitable source of supply through a pipe connecting with the horizontal pipe 3, and as it flows through this pipe, being subjected to the heat of the interior of the chamber A, it will be gradually raised in temperature, so that falling from the end of the pipe it will be converted into steam. This steam passes back toward the inlet and the deeper end of the chamber A and is discharged, as before described, through the outlet-pipe 4, the greater depth of the chamber, as shown at A', forming substantially a steam-dome, from the highest portion of which the steam can be taken. The transverse riffles 2 are made gradually higher from the end at which the water is received to the opposite end, and they serve to prevent the water from flowing freely back along the bottom of the chamber, and they also prevent any water which may be in the chamber from moving backward and forward. Thus if a supply of water and the heat be so proportioned the water will be converted into steam before passing the first of the riffles 2; but if the supply of water is greater than can be converted into steam in this section it will overflow the first riffle 2 into the next section and nearer to the source of heat from the burner. If the supply of water is still greater than can be converted into steam in this section, it will again overflow the next riffle, and so on until it has been sufficiently distributed, so that the full supply of water will be constantly converted into steam. From the dicharge-pipe 4 the steam is conveyed through a branch pipe and delivered so as to be mixed with the oil which is admitted into the burner.

The ends of the chambers A are bored out in line with the pipe 3 and have screw-plugs, as at 9, by which they are closed. Through one of said plugs the pipe 3 passes, and by removal of the other plug the interior of the pipe will be exposed for the purpose of cleaning.

Having thus described my invention, what I claim, and desire to secure by Letters Patent, is—

1. A steam-generator consisting of a tubular chamber extending across a furnace; a pipe extending through said chamber from one end at which water is admitted, said pipe imperforate except for an opening in the end opposite that which the pipe enters; a steam-discharge pipe leading from the end of the chamber opposite to the open end of the pipe; and a series of riffles across the bottom of the chamber and over which the backflow of the water is successively retarded.

2. A steam-generator consisting of a substantially horizontal tubular chamber closed at the ends and having a raised portion or steam-dome at one end, with a discharge-passage therefrom, an inlet-pipe entering at the same end and extending to near the opposite end of the chamber, said pipe having an open discharge, riffles or dams extending transversely of the chamber from one end to the other, said riffles being made gradually higher from the end at which the water is received to the opposite end.

3. The combination with an oil-burner, of a steam-generator consisting of a substantially horizontal closed chamber located above the burner and having transverse dams or riffles upon the bottom, a water-pipe extending through the interior of the chamber, discharging at the opposite end from its entrance, a steam-discharge passage connected with the chamber, and a slidable adjustable guard surrounding the exterior of the generator and movable with relation to the burner.

In witness whereof I have hereunto set my hand.

FREDERICK SAFFELL.

Witnesses:
JOHN C. MOORE,
J. WILBUR CATE.